United States Patent
Koskella et al.

(10) Patent No.: US 12,329,161 B2
(45) Date of Patent: Jun. 17, 2025

(54) SYNTHETIC MICROBIAL COMMUNITY FOR PHYLLOSPHERE APPLICATION

(71) Applicant: The Regents of the University of California, Oakland, CA (US)

(72) Inventors: Britt Koskella, Berkeley, CA (US); Elijah Curtis P. Mehlferber, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 448 days.

(21) Appl. No.: 17/981,384

(22) Filed: Nov. 4, 2022

(65) Prior Publication Data

US 2023/0064807 A1     Mar. 2, 2023

Related U.S. Application Data

(63) Continuation of application No. PCT/US2021/035035, filed on May 28, 2021.

(60) Provisional application No. 63/031,554, filed on May 28, 2020.

(51) Int. Cl.
| | |
|---|---|
| *A01N 63/20* | (2020.01) |
| *A01G 7/06* | (2006.01) |
| *A01P 3/00* | (2006.01) |
| *A01P 21/00* | (2006.01) |

(52) U.S. Cl.
CPC .............. *A01N 63/20* (2020.01); *A01G 7/06* (2013.01); *A01P 3/00* (2021.08); *A01P 21/00* (2021.08)

(58) Field of Classification Search
CPC .......... A01N 63/20; A01N 63/27; A01N 63/22
See application file for complete search history.

(56) References Cited

U.S. PATENT DOCUMENTS

2018/0020671 A1    1/2018  Bioconsortia

OTHER PUBLICATIONS

Elijah C. Mehlferber, Kent F. McCue, Reena Debray, Griffin Kaulbach, Jon E. Ferrel, Rajnish Khanna, Britt Koskella, Early phyllosphere microbial associations impact plant reproductive success, bioRxiv 2022.06.30.498294; doi: https://doi.org/10.1101/2022.06.30.498294, 31 pages (Year: 2022).*
Mehlferber EC, Debray R, Conover AE, Sherman JK, Kaulbach G, Reed R, McCue KF, Ferrel JE, Khanna R and Koskella B (2023) Phyllosphere microbial associations improve plant reproductive success, Front. Plant Sci. 14:1273330. 12 pages (Year: 2023).*
International Search Report, Written Opinion, in priority application PCT/US2021/035035, 15 pages (Sep. 29, 2021).
Berg et al. "Nutrient- and Dose-Dependent Microblome-Mediated Protection against a Plant Pathogen." Current Biology, Aug. 6, 2018 (Aug. 6, 2018), vol. 28, No. 15, pp. 2487-2492, and pp. e1-e9. entire document.

* cited by examiner

*Primary Examiner* — Thane Underdahl
(74) *Attorney, Agent, or Firm* — Richard Aron Osman

(57) ABSTRACT

A synthetic microbial community (SynCom) agricultural crop fertilizer composition comprises a microbial stabilizing buffer and bacterial strains configured to mimic the natural diversity of the bacterial community found in the crop phyllosphere microbiome, but at a reduced complexity, yet sufficient to effectively provide increased plant productivity and/or disease protection.

20 Claims, 2 Drawing Sheets

SYNTHETIC MICROBIAL COMMUNITY FOR PHYLLOSPHERE APPLICATION

This invention was made with government support under Grant Number 1838299 awarded by the National Science Foundation. The government has certain rights in the invention.

INTRODUCTION

Increasing evidence makes clear that the microbial communities living in and on plants are critical to shaping health, longevity, yield, and disease susceptibility. However, a vast majority of current growing practices reduce the natural acquisition of these microbiomes, in many cases purposefully as a consequence of focus on decreased pathogen transmission. One promising way to balance the known benefits of plant-microbial interactions against known costs of pathogen colonization is to generate a synthetic microbial community ("SynCom"). This collection of culturable bacterial isolates can then be used to study and mimic the effects of a naturally diverse microbial community at a reduced, and therefore more manageable, complexity. While a more diverse community is technically more challenging to produce, and there is less predictability of which members will colonize and grow to high densities across various field applications, an effective SynCom can contain a greater breadth of functions, allowing for more general improvements to the plant as compared to the targeted application of specific bacterial agents for one purpose.

Relevant literature includes:
Paredes, et al. (2018). Design of synthetic bacterial communities for predictable plant phenotypes. PLOS Biology, 16, e2003962.
Laforest-Lapointe, et al. (2017). Leaf bacterial diversity mediates plant diversity and ecosystem function relationships. Nature, 546(7656), 145.
Hacquard, et al. (2017). Interplay between innate immunity and the plant microbiota. Annual review of phytopathology, 55: 565-589.
Hu, et al. (2016). Probiotic Diversity Enhances Rhizosphere Microbiome Function and Plant Disease Suppression. MBio 7, e01790-16.
Vorholt et al, "Establishing Causality: Opportunities of Synthetic Communities for Plant Microbiome Research", Cell Host & Microbe, Perspective, 22(2):142-155, Aug. 9, 2017.

SUMMARY OF THE INVENTION

We have constructed a consortia of bacteria designed to mimic the natural diversity of the bacterial community found in the tomato phyllosphere (above ground) microbiome, but at a reduced complexity such that it is scalable and reproducible. The synthetic community we developed provides the plant growth and disease protective benefits of a diverse microbiota after seed and/or foliar application. In examples we demonstrate that microbiome supplementation with our community on greenhouse grown tomato plants increases yield and tomato fruit quality.

In an aspect the invention provides a synthetic microbial community (SynCom) agricultural crop fertilizer composition comprising a microbial stabilizing buffer and phyllosphere microbiome bacterial strains configured to mimic the natural diversity of the bacterial community found in the crop phyllosphere microbiome, but at a reduced complexity, yet sufficient to effectively provide increased plant productivity and/or disease protection.

In embodiments the composition:
comprises a 12s, 13s, 14s, 15s or 16s SynCom, comprising respectively 12, 13, 14, 15 or 16 bacterial strains of 16s SynCom: *Brevibacterium frigoritolerans, Curtobacterium herbarum, Curtobacterium pusillum, Frigoribacterium endophyticum, Microbacterium oleivorans, Rathayibacter festucae, Bacillus wiedmannii, Exiguobacterium sibiricum, Erwinia tasmaniensis, Pantoea agglomerans, Pantoea allii, Massilia aurea, Pseudomonas asturiensis, Pseudomonas moraviensis, Pseudomonas rhizosphaerae*, and *Pseudomonas rhodesiae;*
is configured to provide increased plant productivity and/or disease protection;
is configured to provide increased plant productivity that is plant flower rate, growth rate, fruit per plant, or harvest weight; and/or
is configured to provide increased disease protection or reduce the severity of infection from a pathogen such as *Pseudomonas syringae* (causal agent of bacterial speck) or powdery mildew fungus.

In an aspect, the invention provides a plant comprising a subject composition applied to the phyllosphere of the plant.
In embodiments:
the plant is tomato, the plant is bean or carrot, or the plant is tobacco or cannabis; and/or
the plant is situated in a greenhouse.

In an aspect the invention provides a method of fertilizing an agricultural crop, comprising applying to the crop a subject composition.
In embodiments:
the composition is applied to the phyllosphere of the crop;
the crop is situated in a greenhouse at the time of the application; and/or
further comprises the step of detecting a resultant increased plant productivity and/or disease protection.

The invention encompasses all combinations of the particular embodiments recited herein, as if each combination had been laboriously recited, such as wherein

DESCRIPTION OF PARTICULAR EMBODIMENTS AND DELIVERY METHODS OF THE INVENTION

Figure 1:
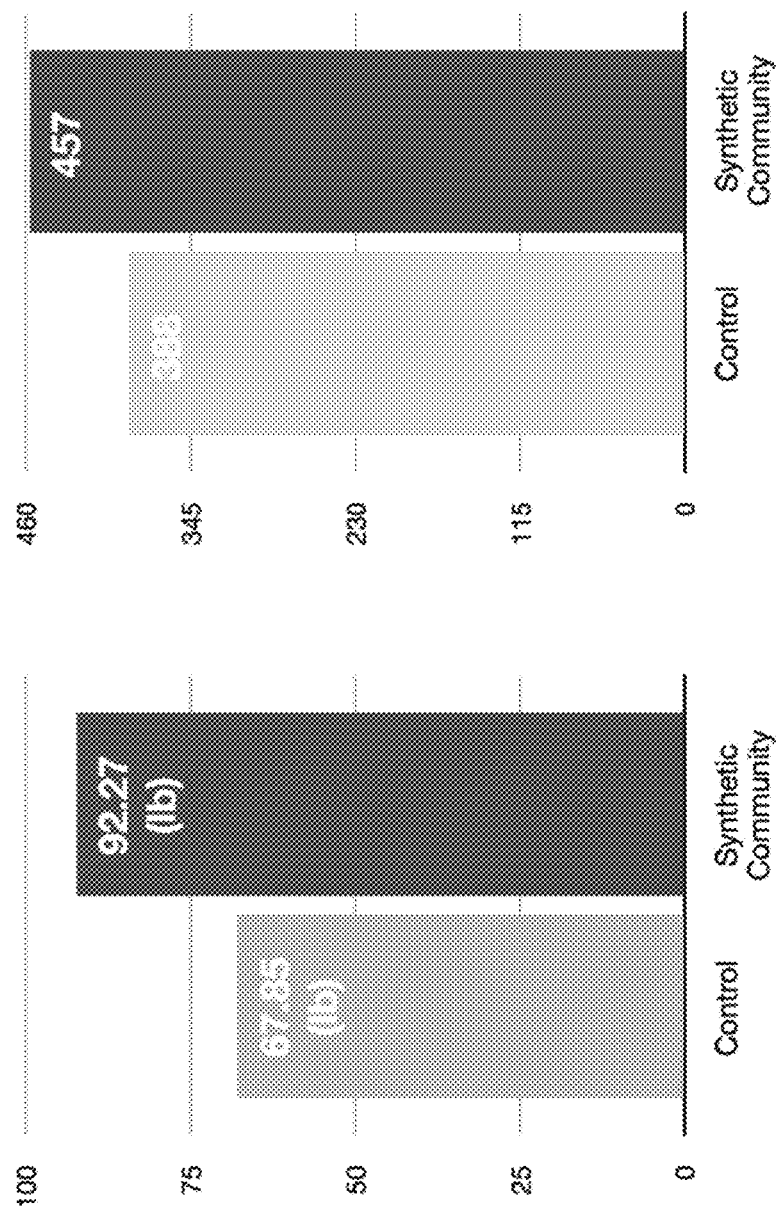
FIG. 1. Increase in total yield (left) and increase in tomatoes produced (right). Total weight of fruit produced by each treatment (8 plants per treatment) and total number of fruit produced per treatment.
Figure 2:
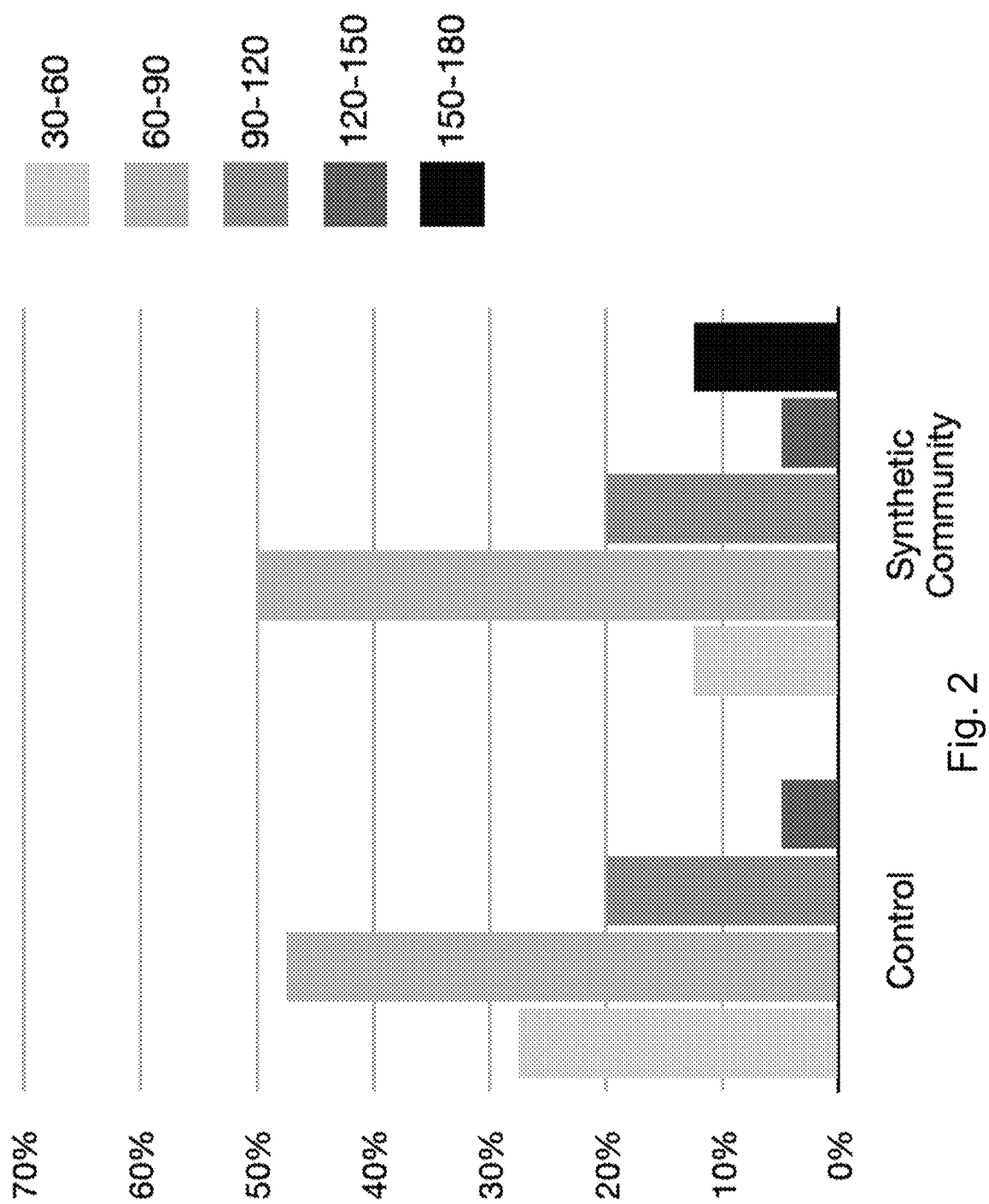
FIG. 2. Weight (Kg) distribution of fruit harvested. The weight distribution of tomatoes harvested from control plants and plants inoculated with the synthetic community. Tomatoes inoculated with the synthetic community have a higher proportion of heavier tomatoes.

Unless contraindicated or noted otherwise, in these descriptions and throughout this specification, the terms "a" and "an" mean one or more, the term "or" means and/or. The examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

We have designed and disclose a plant-associated SynCom that provides the benefits of a naturally diverse microbial community at a reduced complexity to allow for scalability and more complete control and reproducibility. Current biocontrol and plant growth promotion strategies involving bacteria generally focus on either a single species or a small consortium of closely related 'probiotic' species, and are typically applied to the ground or subsurface as soil amendments. In contrast, the synthetic community that we have designed, developed and validated contains diverse bacterial species that are broadly representative of the natural community on a plant, are applied to the phyllosphere, rather than to ground or subsurface, and preferably in a greenhouse, to seedlings in containers, before the crops are transferred to ground. The ease of culturability of our isolates make scaling straight-forward and the diversity of isolates in our SynCom allows for a greater breadth of functions, more flexibility across applications and crop species, and more general improvements to the plant as compared to the targeted application of specific bacterial agents for a single purpose.

The disclosed synthetic community provides benefits of a naturally diverse phyllosphere microbiota at a reduced, and therefore more manageable, complexity. Demonstrable benefits include plant growth promotion, an increase in plant productivity, and disease protection. In particular embodiments the synthetic community can be used to promote plant growth leading to an increase in fruit production and an increase in fruit quality, and reduce the severity of infection from pathogens such as Pseudomonas syringae (causal agent of bacterial speck) and powdery mildew fungus. In embodiments, the community is applied to tomato crops, preferably the tomato phyllosphere (above ground tissues).

In application the invention can promote plant growth, leading to an increase in fruit/vegetable yield, as well as an increase in the size and weight of fruit/vegetable produced, while also increasing fruit value and nutritional content; aid protection against plant pathogens, and decrease severity of phyllosphere-associated diseases; and/or synergistically with other nutrient amendments products increase the ability of the plant to uptake and utilize these amendments.

16s SynCom is comprised of 16 bacterial isolates (Table 1), all originating from the tomato phyllosphere, and represent a broad diversity of a healthy, field grown microbiota. While the bacteria were originally isolated from tomato leaves, they can be applied to other crops to yield similar effects. In embodiments the invention provides the community, and the application of the community, or the consortia amended with additional members.

The SynCom may be applied as a spray to the leaf/stem/fruit/vegetable surface of the plant, and/or to the base of the plant, once or multiple times throughout the growth of the plant. The SynCom can also be applied directly to the soil in which a plant is growing. The exact specifications of application will depend on the setting in which they are used. In an exemplary application it may be suspended in 10 Mm Magnesium Chloride, or similar stabilizing buffer, at a total optical density of 0.02 measured at 600 nm on a conventional plate reader with the optional addition of 0.01% surfactant/spreader (for example, Silwet L77).

Our SynComm phyllosphere microbiota can also be applied during early growth to influence drying and curing post-harvest. We have shown that our synthetic community can increase fruit nutritional value, overall yield, and disease resistance. We have further demonstrated that the early life application is durable, as the microbes do successfully colonize the host plants onto which they are applied, and field trials show that application of these microbial communities to seedlings in the greenhouse (so-called starter plants) has long-lasting impacts on plant health in the field; these field trials include tomato and other agricultural species, including bean and carrot.

Our phyllosphere synthetic microbiomes can also be used to increase the success and outcome of drying/curing plants post-harvest, wherein the microbiome on the leaves at the time of harvest impact fruit/vegetable shelf life by reducing the likelihood of opportunistic pathogen colonization during storage or through the food system. Our results indicate that early application of the SynComm impacts adult plant microbiome composition and can effect a reduction in food spoilage. For crops that require drying/curing before sale, such as tobacco and cannabis, application of synthetic communities at the seedling stage can impact microbiome composition at harvest, offering alternative curing outcomes.

Application of the SynCom increases plant growth rate. Results from a greenhouse trials indicate that application of the SynCom to tomato plants early in development increase growth rate of the plants relative to those sprayed only with buffer.

Application of the SynCom increases flowers per plant. Results from the same greenhouse trials indicate that application of the SynCom to tomato plants early in development also increases flower production relative to those sprayed only with buffer.

Application of the SynCom increases fruit produced per plant. Results from the same greenhouse trials indicate that application of the SynCom to tomato plants early in development ultimately increases production of fruit relative to those sprayed only with buffer.

Application of the SynCom increases total harvest weight. Results from greenhouse trials indicate that application of the SynCom to tomato plants early in development results in greater fruit harvest weight relative to those sprayed only with buffer.

Application of the SynCom increases tomato nutritional value. Finally, nutritional analysis from greenhouse trials indicates that application of the SynCom to tomato plants early in development results in an increase in Beta-Carotene and Lycopene content relative to those sprayed only with buffer.

Preparation and inoculation of the SynCom. Each member of the SynCom is individually grown in KB broth for a total of 3 days before it is concentrated by centrifugation at 2500 g for ten minutes and the optical density is measured at 600 nm. The SynCom is then mixed together at equal densities, and the final density is adjusted so that it will equal 0.02 when measured at 600 nm in the desired volume of solution for application. The SynCom is then frozen in ⅓ glycerol and ⅔ KB at −80° C. until time for inoculation. At the time of inoculation the SynCom is thawed and spun at 2500 g for ten minutes until it has pelleted, and the KB and glycerol is poured off. The SynCom is then resuspended in the desired volume of Magnesium Chloride buffer and a surfactant (Silwet) is added at a concentration of 0.01%. This solution can then be used immediately, or stored, in our tests for a period of at least 24 hours. The SynCom is inoculated onto seedlings by spraying the tops and bottoms of the leaves with a fine mist sprayer until runoff to ensure even coating. These inoculations typically take place three times while the plant is still young, ideally between the ages of 2 and 10 weeks.

Application of the SynCom increases stress resistance and disease tolerance. During the course of our experiments, we have shown that the SynCom is capable of increasing stress resistance and disease tolerance. As part of our trial we included various levels of a micronutrient fertilizer to determine if there was an interaction between the nutrient supplement and the SynCom mode of action. During that experiment we found that the highest concentration of fertilizer proved deleterious to the plant, and led to a decreased yield in the total number of tomatoes, below our baseline control. However, the plants that had been treated with the SynCom did not see a significant decrease in tomatoes produced, and their productivity was partially rescued. Furthermore, throughout the course of our experiment the plants were severely impacted by powdery mildew disease, however, the effects of the SynCom were robust against this pressure, and despite the disease we still observed a significant increase in tomato production. These observations, taken together, indicate that the effects of the SynCom are robust to plant stress, and function to decrease the impact of stress on the productivity of the plant.

Application of the SynCom increases fruit produced per plant. Results from independently replicated greenhouse trials indicate that the application of the SynCom to tomatoes early in their development increases the number of tomatoes produced per plant relative to those sprayed only with buffer.

Application of SynCom does not reduce individual tomato weight. The results of the same trials referenced above indicate that the increase in total number of tomatoes produced per plant does not come with a corresponding decrease in individual tomato weight, indicating that the above results yield a net increase in the total harvest of SynCom treated plants when compared to comparable buffer sprayed plants.

SynCom establishes robustly on treated plants. Profiling of the microbiome by either droplet digital PCR to measure absolute bacterial abundance or 16s Amplicon sequencing to identify individual strains showed that the SynCom consortia, when applied early in development (seedlings) in the greenhouse, lead to significant, beneficial bacterial growth of the synthetic community members. In contrast, plants sprayed with a buffer solution (negative controls) have very low phyllosphere bacterial microbiome abundance. This shows that dispersal of phyllosphere microbiota in the greenhouse is generally low, but that application of the SynCom microbiome consortia substantially increases both diversity and density.

SynCom 12s, 13s, 14s, 15s mimic 16s in targeted applications. Relative abundance analyses demonstrate that 12, 13, 14, 15 or 16 of the 16s species can establish robust colonization densities, depending on the plant species and conditions; hence we formulated representative 12s, 13s, 14s and 15s SynComs. Targeted applications of these SynComs similarly achieve effective increases in plant growth rate, flowers per plant, fruit produced per plant, total harvest weight, nutritional value, stress resistance and disease tolerance, fruit produced per plant and fruit weight produced per plant, and total crop yield. Hence, effective 12s, 13s, 14s and 15s SynComs may be formulated from panels of 12, 13, 14 or 15 species of SynCom 16s.

TABLE 1

List of species identities for all strains included in the SynCom16s, as identified via whole genome sequencing.

| Phylum | Family | Species identity |
| --- | --- | --- |
| Actinobacteria | Microbacteriaceae | *Curtobacterium herbarum* |
| Actinobacteria | Microbacteriaceae | *Curtobacterium pusillum* |
| Actinobacteria | Microbacteriaceae | *Frigoribacterium endophyticum* |
| Actinobacteria | Microbacteriaceae | *Microbacterium oleivorans* |
| Actinobacteria | Microbacteriaceae | *Rathayibacter festucae* |
| Firmicutes | Bacillaceae | *Bacillus wiedmannii* |
| Firmicutes | Brevibacteriaceae | *Brevibacterium frigoritolerans* |
| Firmicutes | Bacillales | *Exiguobacterium sibiricum* |
| Proteobacteria | Erwiniaceae | *Erwinia tasmaniensis* |
| Proteobacteria | Erwiniaceae | *Pantoea agglomerans* |
| Proteobacteria | Erwiniaceae | *Pantoea allii* |
| Proteobacteria | Oxalobacteraceae | *Massilia aurea* |
| Proteobacteria | Pseudomonadaceae | *Pseudomonas asturiensis* |
| Proteobacteria | Pseudomonadaceae | *Pseudomonas moraviensis* |
| Proteobacteria | Pseudomonadaceae | *Pseudomonas rhizosphaerae* |
| Proteobacteria | Pseudomonadaceae | *Pseudomonas rhodesiae* |

Example SynCom15s formulation, omitting sp: *Microbacterium oleivorans*.

*Curtobacterium herbarum, Curtobacterium pusillum, Frigoribacterium endophyticum, Rathayibacter festucae, Bacillus wiedmannii, Brevibacterium frigoritolerans, Exiguobacterium sibiricum, Erwinia tasmaniensis, Pantoea agglomerans, Pantoea allii, Massilia aurea, Pseudomonas asturiensis, Pseudomonas moraviensis, Pseudomonas rhizosphaerae, Pseudomonas rhodesiae*

Example SynCom14s formulation, omitting sp: *Microbacterium oleivorans, Brevibacterium frigoritolerans*.

*Curtobacterium herbarum, Curtobacterium pusillum, Frigoribacterium endophyticum, Rathayibacter festucae, Bacillus wiedmannii, Exiguobacterium sibiricum, Erwinia tasmaniensis, Pantoea agglomerans, Pantoea allii, Massilia aurea, Pseudomonas asturiensis, Pseudomonas moraviensis, Pseudomonas rhizosphaerae, Pseudomonas rhodesiae*

Example SynCom13s formulation, omitting sp: *Microbacterium oleivorans, Brevibacterium frigoritolerans, Curtobacterium herbarum*.

*Curtobacterium pusillum, Frigoribacterium endophyticum, Rathayibacter festucae, Bacillus wiedmannii, Exiguobacterium sibiricum, Erwinia tasmaniensis, Pantoea agglomerans, Pantoea allii, Massilia aurea, Pseudomonas asturiensis, Pseudomonas moraviensis, Pseudomonas rhizosphaerae, Pseudomonas rhodesiae*

Example SynCom12s formulation, omitting sp: *Microbacterium oleivorans, Brevibacterium frigoritolerans, Curtobacterium herbarum. Curtobacterium pusillum*.

*Frigoribacterium endophyticum, Rathayibacter festucae, Bacillus wiedmannii, Exiguobacterium sibiricum, Erwinia tasmaniensis, Pantoea agglomerans, Pantoea allii, Massilia aurea, Pseudomonas asturiensis, Pseudomonas moraviensis, Pseudomonas rhizosphaerae, Pseudomonas rhodesiae*

The invention claimed is:

1. A method of fertilizing an agricultural crop, comprising applying to the crop a synthetic microbial community (SynCom) agricultural crop fertilizer composition comprising a microbial stabilizing buffer and phyllosphere microbiome bacterial strains configured to mimic the natural diversity of the bacterial community found in the crop phyllosphere microbiome, but at a reduced complexity, yet sufficient to effectively provide increased plant productivity or disease protection, wherein the bacterial strains are: *Brevibacterium frigoritolerans, Curtobacterium herbarum, Curtobacterium pusillum, Frigoribacterium endophyticum, Microbacterium*

*oleivorans, Rathayibacter festucae, Bacillus wiedmannii, Exiguobacterium sibiricum, Erwinia tasmaniensis, Pantoea agglomerans, Pantoea allii, Massilia aurea, Pseudomonas asturiensis, Pseudomonas moraviensis, Pseudomonas rhizosphaerae*, and *Pseudomonas rhodesiae*.

2. The method of claim 1, wherein the composition is configured to provide increased plant productivity that is plant flower rate, growth rate, fruit per plant, or harvest weight.

3. The method of claim 1, wherein the composition is configured to provide increased disease protection from a pathogens that is *Pseudomonas syringae* or powdery mildew fungus.

4. The method of claim 1, wherein the microbial stabilizing buffer comprises a magnesium chloride buffer and a surfactant.

5. The method of claim 1, wherein the crop is between the ages of 2 and 10 weeks.

6. The method of claim 1, wherein the composition is applied to the phyllosphere of the crop.

7. The method of claim 1, wherein the crop is situated in a greenhouse.

8. The method of claim 1, further comprising the step of detecting a resultant increased plant productivity or disease protection.

9. The method of claim 1, wherein the microbial stabilizing buffer comprises a magnesium chloride buffer and a surfactant, the crop is between the ages of 2 and 10 weeks, the composition is applied to the phyllosphere of the crop, and the crop is situated in a greenhouse.

10. The method of claim 1, wherein the microbial stabilizing buffer comprises a magnesium chloride buffer and a surfactant, the crop is between the ages of 2 and 10 weeks, the composition is applied to the phyllosphere of the crop, and the crop is situated in a greenhouse, and further comprising the step of detecting a resultant increased plant productivity or disease protection.

11. The method of claim 1, wherein the crop is tomato.
12. The method of claim 2, wherein the crop is tomato.
13. The method of claim 3, wherein the crop is tomato.
14. The method of claim 4, wherein the crop is tomato.
15. The method of claim 5, wherein the crop is tomato.
16. The method of claim 6, wherein the crop is tomato.
17. The method of claim 7, wherein the crop is tomato.
18. The method of claim 8, wherein the crop is tomato.
19. The method of claim 9, wherein the crop is tomato.
20. The method of claim 10, wherein the crop is tomato.

* * * * *